US009173243B2

(12) United States Patent
Tajima et al.

(10) Patent No.: US 9,173,243 B2
(45) Date of Patent: Oct. 27, 2015

(54) WIRELESS COMMUNICATION SYSTEM, RELAY STATION, BASE STATION, AND WIRELESS COMMUNICATION METHOD

(71) Applicant: FUJITSU LIMITED, Kawasaki-shi, Kanagawa (JP)

(72) Inventors: Yoshiharu Tajima, Yokohama (JP); Yoshinori Tanaka, Yokohama (JP); Yoshihiro Kawasaki, Kawasaki (JP); Yoshiaki Ohta, Yokohama (JP); Katsumasa Sugiyama, Kawasaki (JP); Kazuhisa Obuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 13/909,790

(22) Filed: Jun. 4, 2013

(65) Prior Publication Data

US 2013/0267223 A1 Oct. 10, 2013

Related U.S. Application Data

(63) Continuation of application No. PCT/JP2011/050373, filed on Jan. 12, 2011.

(51) Int. Cl.
*H04B 7/155* (2006.01)
*H04W 76/02* (2009.01)
(Continued)

(52) U.S. Cl.
CPC ............. *H04W 76/028* (2013.01); *H04B 7/155* (2013.01); *H04W 88/04* (2013.01); *H04W 68/00* (2013.01); *H04W 84/047* (2013.01)

(58) Field of Classification Search
CPC . H04W 84/047; H04W 76/028; H04W 36/08; H04W 88/04
See application file for complete search history.

(56) References Cited

U.S. PATENT DOCUMENTS

2011/0080825 A1\* 4/2011 Dimou et al. .................. 370/216
2011/0092236 A1 4/2011 Iwamura et al.
(Continued)

FOREIGN PATENT DOCUMENTS

CN 101919284 A 12/2010
JP 2000-50359 2/2000
(Continued)

OTHER PUBLICATIONS

Notice of Rejection issued for corresponding Japanese Patent Application No. 2012-552567, mailed on Jun. 17, 2014, with an English translation.
CMCC, "Discussion on RLF on Relay Backhaul", Agenda Item: 7.2.1.2, Apr. 12-16, 2010, pp. 1-3, 3GPP TSG-RAN WG2 Meeting #69bis, R2-102422, 3GPP, Beijing, China.
(Continued)

*Primary Examiner* — Nam Huynh
(74) *Attorney, Agent, or Firm* — Myers Wolin, LLC

(57) ABSTRACT

A wireless communication system is provided in which a relay station relays wireless communication between a base station and a mobile station. The relay station includes an acquiring unit and a notifying unit. The acquiring unit acquires, from the base station that retains information on the mobile station used for the wireless communication, identification information on the base station. The notifying unit notifies the mobile station of the identification information acquired by the acquiring unit. Furthermore, the mobile station includes a reconnecting unit. When connection with the relay station is released, the reconnecting unit performs a reconnection request with respect to the base station that is identified by the identification information that is notified by the relay station.

8 Claims, 9 Drawing Sheets

(51) Int. Cl.
*H04W 88/04* (2009.01)
*H04W 68/00* (2009.01)
*H04W 84/04* (2009.01)

(56) References Cited

U.S. PATENT DOCUMENTS

| | | |
|---|---|---|
| 2011/0124330 A1 | 5/2011 | Kojima |
| 2011/0211458 A1 | 9/2011 | Ishii et al. |
| 2012/0142336 A1* | 6/2012 | Van Phan et al. ............. 455/423 |

FOREIGN PATENT DOCUMENTS

| | | |
|---|---|---|
| JP | 2010-004503 | 1/2010 |
| JP | 2010-103966 | 5/2010 |
| JP | 2011-109593 | 6/2011 |
| WO | 2010/032775 A1 | 3/2010 |
| WO | 2010/087105 | 8/2010 |

OTHER PUBLICATIONS

Qualcomm Incorporated, "RLF handling at relay node", Agenda Item: 7.2.1.2, Apr. 12-16, 2010, 3GPP TSG RAN WG2 #69bis, R2-102402, 3GPP, Beijing, China.

Notice of Preliminary Rejection issued for corresponding Korean Patent Application No. 10-2013-7016824 mailed on Oct. 13, 2014, with an English Translation.

3GPP TR 36.806 V9.0.0, "3rd Generation Partnership Project; Technical Specification Group Radio Access Network; Evolved Universal Terrestrial Radio Access (E-UTRA); Relay architectures for E-UTRA (LTE-Advanced) (Release 9)", Mar. 2010.

International search report and written opinion issued for corresponding International Patent Application No. PCT/JP2011/050373, mailed Apr. 19, 2011, with English translation.

First Notification of Office Action issued for corresponding Chinese Patent Application No. 201180064134.4 dated Aug. 6, 2015 with an English translation.

* cited by examiner

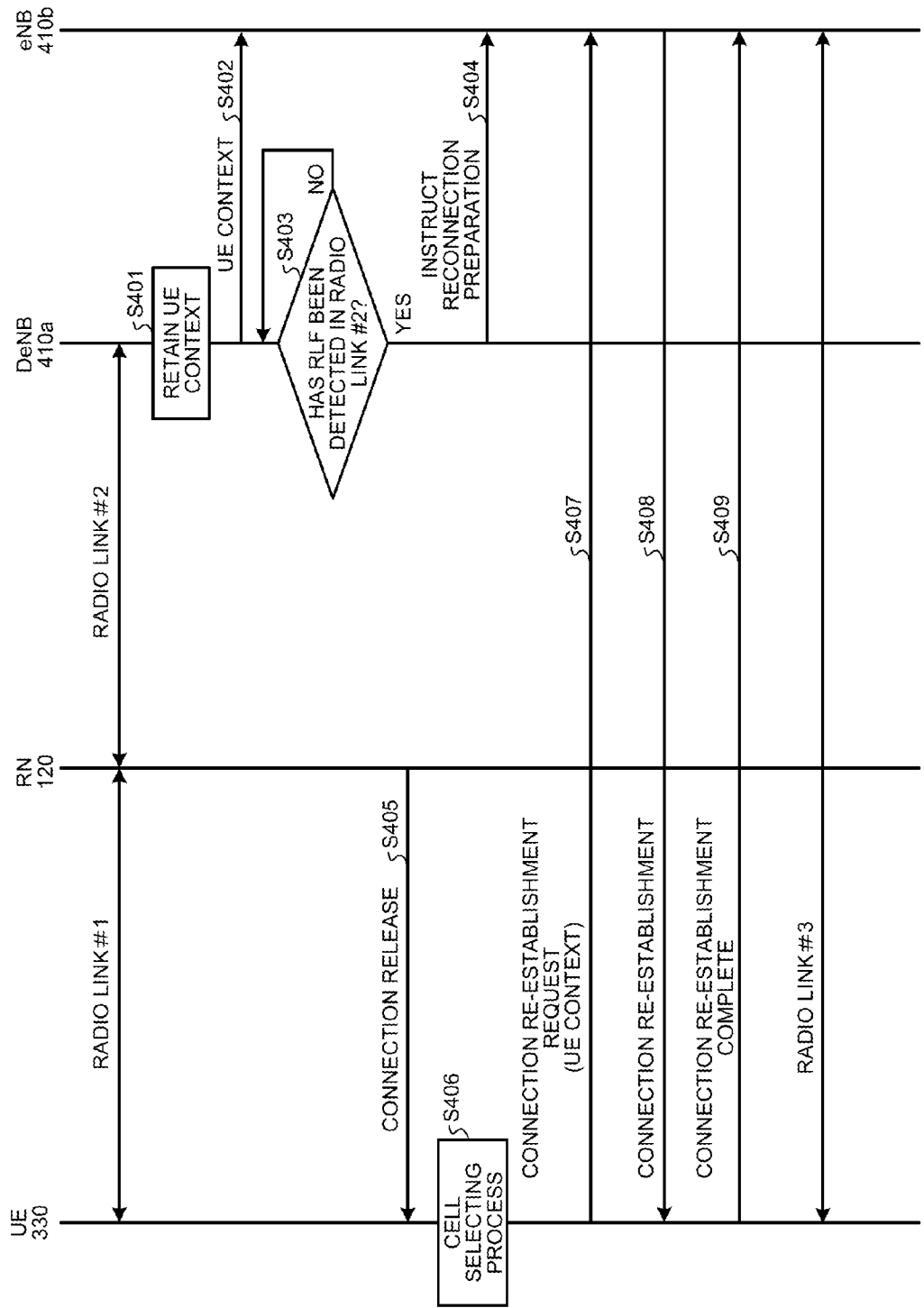

WIRELESS COMMUNICATION SYSTEM, RELAY STATION, BASE STATION, AND WIRELESS COMMUNICATION METHOD

CROSS-REFERENCE TO RELATED APPLICATION

This application is a continuation application of International Application PCT/JP2011/050373, filed on Jan. 12, 2011, and designating the U.S., the entire contents of which are incorporated herein by reference.

FIELD

The embodiments discussed herein are directed to a wireless communication system, a relay station, a base station, and a wireless communication method.

BACKGROUND

In recent years, in order to implement faster high-speed and greater high-volume wireless communication, discussions have taken place at standardization conferences related to 3GPP (3rd Generation Partnership Project) on LTE advanced, which is an expansion of the Long Term Evolution (LTE) system that is one of the wireless communication systems. In a wireless communication system that uses the LTE-Advanced system, a relay station is scheduled to be set up in a blind zone, such as a boundary of cells of a base station, and the station is scheduled to relay wireless communication between a mobile station and a base station. If a radio link failure (RLF) occurs between the base station and the relay station due to the quality of the radio link being degraded, the mobile station working under the relay station selects a cell that satisfies a predetermined quality and performs a reconnecting process with respect to a base station that forms the selected cell.

Furthermore, there is also a known conventional technology described below that uses a base station as a relay station. Specifically, when a link with a higher level network is disconnected, the base station transfers an outgoing call received from the mobile station to an adjacent base station and the adjacent base station that has received the transferred outgoing call relays communication between the mobile station and the higher level network.

Patent Literature 1: Japanese Laid-open Patent Publication No. 2000-050359

In the wireless communication system that uses the LTE-Advanced system, there is however a problem in that, if any RLF occurs between a base station and a relay station, the mobile station working under the relay station is not able to continue wireless communication.

Specifically, in a wireless communication system that uses the LTE-Advanced system, if any RLF occurs between the base station and the relay station, the mobile station selects a cell that satisfies a predetermined quality and performs a reconnecting process with respect to a base station that forms the reselected cell. When the mobile station performs the reconnecting process, it sometimes sends a reconnection request to a base station other than the original base station with which it was communicating via the relay station. In such a case, the base station, which has received the reconnection request from the mobile station, does not retain the mobile station's information (UE context) which is used to establish wireless communication with the mobile station. It is prescribed in the LTE-Advanced system that a base station that has received a reconnection request from a mobile station is allowed to reconnect with a mobile station in accordance with the reconnection request only when the base station retains the UE context; therefore, the other base station above, that do not have the UE context are not able to accept the reconnection request from the mobile station. Consequently, the mobile station that works under the relay station needs to try establish a new connection with another base station, and thus is not able to continue wireless communication with the base station with which it was originally communicating.

SUMMARY

A wireless communication system in which a relay station relays wireless communication between a base station and a mobile station is provided. the relay station includes an acquiring unit that acquires, from the base station that retains information on the mobile station used for the wireless communication, identification information on the base station, and a notifying unit that notifies the mobile station of the identification information acquired by the acquiring unit. And the mobile station includes a reconnecting unit that performs, when connection with the relay station is released, a reconnecting process with respect to the base station that is identified by the identification information that has been notified by the relay station to the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a sequence diagram illustrating the flow of a reconnecting process performed by the wireless communication system according to the fourth embodiment.

DESCRIPTION OF EMBODIMENTS

Preferred embodiments of a wireless communication system, a relay station, a base station, and a wireless communication method disclosed in the present invention will be described in detail below with reference to the accompanying drawings. In the embodiments described below, a description will be given of a case in which the wireless communication system, the relay station, and the base station disclosed in the present invention are used for a wireless communication system, a relay station, and a base station that uses an LTE-Advanced system as a wireless communication system, respectively. However, the wireless communication system, the relay station, the base station, and the wireless communication method disclosed in the present invention may also be used for a wireless communication system that uses another cellular system other than an LTE-Advanced system.

[a] First Embodiment

Figure 1:
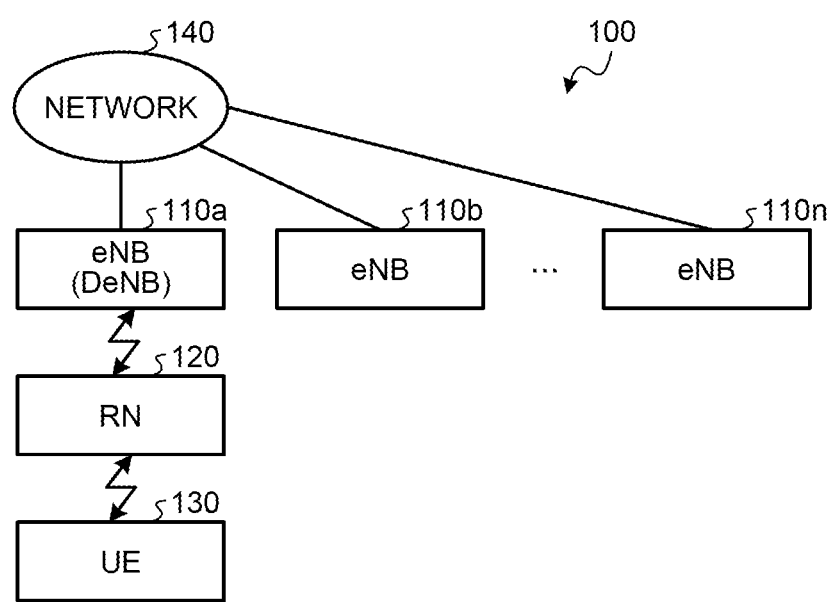
FIG. 1 is a schematic diagram illustrating an example configuration of a wireless communication system according to a first embodiment.

First, an example configuration of a wireless communication system according to a first embodiment will be described with reference to FIG. 1. FIG. 1 is a schematic diagram illustrating an example configuration of a wireless communication system according to a first embodiment. As illustrated in FIG. 1, a wireless communication system 100 according to the first embodiment includes base stations (hereinafter, referred to as an evolved Node B: eNB) 110a to 110n, a relay station (hereinafter, referred to as a Relay Node: RN) 120, a mobile station (hereinafter, referred to as User Equipment: UE) 130, and a network 140.

The eNBs 110a to 110n are communication devices that each accommodate a cell that is a wireless communication area having a predetermined size and that each provide the RN 120 and the UE 130 located in the cell accommodated by the corresponding eNB with a radio link. From among the eNBs 110, the Donor evolved Node B (DeNB) 110a is an eNB through which wireless communication with the UE 130 is relayed by the RN 120.

The DeNB 110a functions as a communication path between the network 140 and the RN 120 when wireless communication is performed between the UE 130 and the RN 120 that is set up in a cell area accommodated by the DeNB 110a. At this point, the DeNB 110a acquires, from the RN 120, setting information (UE context) on the UE 130 used for wireless communication between the DeNB 110a and the UE 130 and retains the setting information (UE context) in a predetermined storing unit.

The RN 120 is a wireless communication apparatus that is set up in an area of a cell accommodated by the DeNB 110a. The RN 120 establishes a radio link with the DeNB 110a and establishes a radio link with the UE 130 that is located in the cell accommodated by the DeNB 110a, thereby relaying wireless communication between the network 140 and the UE 130 by using these radio links. For example, by using the radio links established between the DeNB 110a and the UE 130, the RN 120 relays data or a signal from the DeNB 110a to the UE 130 and also relays data or a signal from the UE 130 to the DeNB 110a.

Furthermore, if any failure (Radio link Failure: RLF) occurs in the radio link established with the DeNB 110a, the RN 120 transmits, to the UE 130, a connection release instruction indicating that the connection with the RN 120 is released.

The UE 130 is a movable wireless communication apparatus and is, for example, a mobile phone terminal. The network 140 is a large-capacity wide area network. The UE 130 communicates with the network 140 via the RN 120 that accommodates a cell in which the UE 130 is located. If the UE 130 receives a connection release instruction transmitted from the RN 120, the UE 130 releases the radio link with the RN 120 and selects a cell other than the cell of the RN 120.

With this configuration, in the wireless communication system according to the first embodiment, the RN 120 acquires identification information on the DeNB 110a from the DeNB 110a. Then, the RN 120 notifies the UE 130 of the acquired identification information on the DeNB 110a.

Then, if the UE 130 receives the connection release instruction that has been transmitted from the RN 120, the UE 130 performs a reconnecting process on the DeNB 110a that is identified by the identification information received, as a notification, from the RN 120.

As described above, in the wireless communication system 100 according to the first embodiment, the RN 120 notifies the UE 130 of the identification information on the DeNB 110a. Then, if the connection with the RN 120 is released, the UE 130 performs a reconnecting process on the DeNB 110a that is identified by the identification information received from the RN 120 as a notification. It is prescribed in LTE-Advanced systems that an eNB that has received a reconnection request from a UE is allowed to continue wireless communication with the UE in accordance with the reconnection request only when the eNB retains the UE context.

Consequently, in the wireless communication system 100, because the UE 130 performs a reconnecting process on the DeNB 110a that retains the UE context, the UE 130 can continue wireless communication even if an RLF occurs between the RN 120 and the DeNB 110a.

Figure 2:
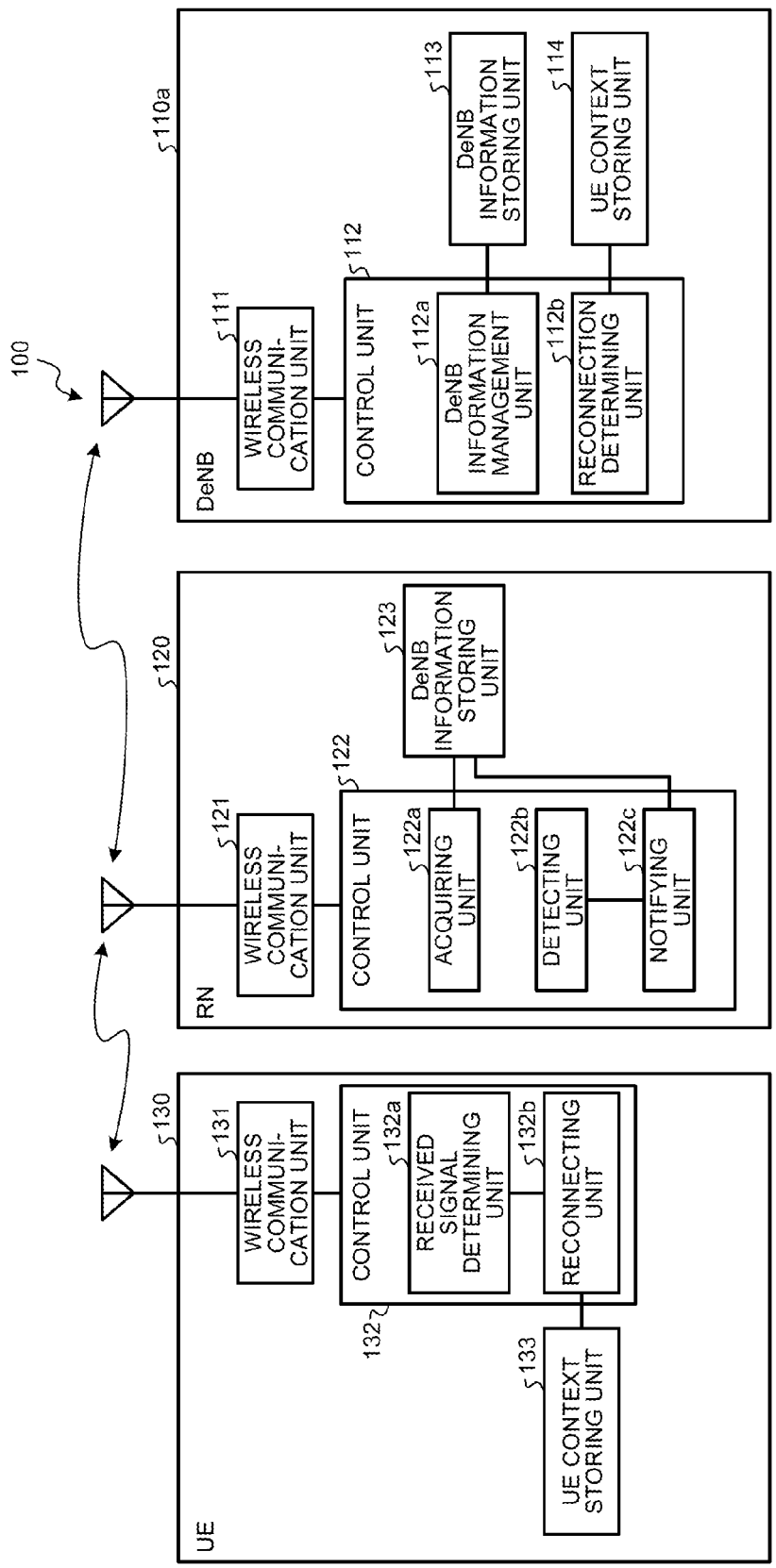
FIG. 2 is a block diagram illustrating the configuration of the wireless communication system according to the first embodiment.

In the following, the wireless communication system 100 according to the first embodiment will be described in detail. FIG. 2 is a block diagram illustrating the configuration of the wireless communication system 100 according to the first embodiment. FIG. 2 illustrates the configuration of the DeNB 110a as a representative example from among the eNBs 110a to 110n illustrated in FIG. 1; however, the eNBs other than the DeNB 110a have the same configuration as that of the DeNB 110a. As illustrated in FIG. 2, the wireless communication system 100 according to the first embodiment includes the DeNB 110a, the RN 120, and the UE 130.

The RN 120 illustrated in FIG. 2 includes a wireless communication unit 121, a control unit 122, and a DeNB information storing unit 123. The wireless communication unit 121 is a communication unit that relays wireless communication between the DeNB 110a and the UE 130. Specifically, the wireless communication unit 121 establishes a radio link with the DeNB 110a and establishes a radio link with the UE 130, which is located in a cell accommodated by the DeNB 110a, and thereby relays wireless communication with the UE 130 by using the radio links. The control unit 122 transmits and receives a signal to/from the DeNB 110a or the UE 130 via the wireless communication unit 121. However, in the following, for convenience of explanation, a description will sometimes be given as if the control unit 122 directly transmits and receives a signal to/from the DeNB 110a or the UE 130.

The control unit 122 includes an internal memory for storing therein data and programs prescribing various kinds of procedures, whereby various kinds of processes are executed. Specifically, the control unit 122 includes an acquiring unit 122a, a detecting unit 122b, and a notifying unit 122c.

The acquiring unit 122a acquires identification information on the DeNB 110a from the DeNB 110a. Specifically, if a radio link is established between the DeNB 110a and the RN 120, the acquiring unit 122a transmits, to the DeNB 110a, an identification information transmission request signal that requests the transmission of the identification information on the DeNB 110a. Then, in accordance with the identification information transmission request signal, the acquiring unit 122a acquires the identification information on the DeNB

110*a*, which is transmitted from the DeNB 110*a*, via the radio link. The identification information on the DeNB 110*a* is, for example, the Physical Cell Identity (PCI) of the DeNB 110*a*. The identification information on the DeNB 110*a* acquired by the acquiring unit 122*a* is stored in the DeNB information storing unit 123.

The detecting unit 122*b* detects an RLF in the radio link that has been established between the DeNB 110*a* and the RN 120. For example, the detecting unit 122*b* monitors the reception quality of the signal received from the DeNB 110*a* and detects, if the reception quality becomes equal to or less than a predetermined value, an RLF in the radio link that has been established between the DeNB 110*a* and the RN 120. An example of the reception quality includes the received power of a reference signal or the like.

The notifying unit 122*c* notifies the UE 130 of the identification information on the DeNB 110*a* that is stored in the DeNB information storing unit 123 by the acquiring unit 122*a*. Specifically, if an RLF in the radio link with the DeNB 110*a* is detected by the detecting unit 122*b*, the notifying unit 122*c* generates a Connection Release signal that instructs the UE 130 to release the connection with the RN 120. Then, the notifying unit 122*c* sends a notification by including, in the generated Connection Release signal, the identification information on the DeNB 110*a* that is stored in the DeNB information storing unit 123. If the identification information on the DeNB is not stored in the DeNB information storing unit 123, the notifying unit 122*c* notifies the UE 130 of the generated Connection Release signal.

The DeNB information storing unit 123 stores therein the identification information on the DeNB 110*a* that has been acquired by the acquiring unit 122*a*.

The UE 130 illustrated in FIG. 2 includes a wireless communication unit 131, a control unit 132, and a UE context storing unit 133. The wireless communication unit 131 is a communication unit that performs wireless communication with the DeNB 110*a* or with the RN 120. Specifically, the wireless communication unit 131 establishes a radio link with the RN 120 and performs wireless communication with the RN 120 by using this radio link. For example, the wireless communication unit 131 receives, from the RN 120, the Connection Release signal that instructs the UE 130 to release the connection with the RN 120.

Furthermore, the wireless communication unit 131 transmits a signal to be sent to the DeNB 110*a*. The signal to be sent to the DeNB 110*a* is, for example, a Connection Re-establishment Request signal that requests reconnection with respect to the DeNB 110*a*. Furthermore, the wireless communication unit 131 receives a signal sent from the DeNB 110*a*. The signal from the DeNB 110*a* is, for example, a Connection Re-establishment signal that allows reconnection with the UE 130.

In practice, the control unit 132 transmits and receives a signal to/from the RN 120 or the DeNB 110*a* via the wireless communication unit 131. However, in the following, for convenience of explanation, a description will sometimes be given as if the control unit 132 directly transmits and receives a signal to/from the RN 120 or the DeNB 110*a*.

The control unit 132 includes an internal memory for storing therein data and programs prescribing various kinds of procedures, whereby various kinds of processes are executed. Specifically, the control unit 132 includes a received signal determining unit 132*a* and a reconnecting unit 132*b*.

The received signal determining unit 132*a* determines whether the signal received by the wireless communication unit 131 is a predetermined signal and notifies the reconnecting unit 132*b* of the determination result. For example, the received signal determining unit 132*a* determines whether the signal received by the wireless communication unit 131 is a Connection Release signal that instructs the UE 130 to release the connection with the RN 120 and notifies the reconnecting unit 132*b* of the determination result. Furthermore, for example, the received signal determining unit 132*a* determines whether the signal received by the wireless communication unit 131 is a Connection Re-establishment signal that allows the reconnection with the UE 130 and notifies the reconnecting unit 132*b* of the determination result.

When the connection between the UE 130 and the RN 120 is released, the reconnecting unit 132*b* performs a reconnecting process with respect to the DeNB 110*a* that is identified by the identification information received from the RN 120 as a notification. Specifically, the reconnecting unit 132*b* receives a determination result performed by the received signal determining unit 132*a*. Then, if the reconnecting unit 132*b* receives a determination result indicating that the Connection Release signal has been received by the wireless communication unit 131, the reconnecting unit 132*b* determines whether the identification information on the DeNB 110*a* is included in the Connection Release signal. If the identification information is included in the Connection Release signal, the reconnecting unit 132*b* generates a Connection Re-establishment Request signal that requests reconnection from the DeNB 110*a* that is identified by the identification information. Then, the reconnecting unit 132*b* transmits, to the DeNB 110*a*, a Connection Re-establishment Request signal including the UE context that is stored in the UE context storing unit 133. The reconnecting unit 132*b* receives, from the DeNB 110*a*, a Connection Re-establishment signal in accordance with the Connection Re-establishment Request signal. Then, the reconnecting unit 132*b* transmits, to the DeNB 110*a*, a Connection Re-establishment Complete signal indicating that reconnection with the DeNB 110*a* has been completed. Consequently, reconnection between the UE 130 and the DeNB 110*a* is successful and thus the UE 130 can continue to perform wireless communication with the DeNB 110*a*.

If the identification information is not included in the Connection Release signal, the reconnecting unit 132*b* performs a cell selecting process that selects a cell that satisfies a predetermined quality. For example, the reconnecting unit 132*b* reperforms in the cell selecting process, from among the cells formed by the eNBs 110*a* to 110*b*, the selecting of a cell with a transmission radio wave strength that is equal to or greater than a predetermined value. Then, the reconnecting unit 132*b* generates a Connection Re-establishment Request signal that requests reconnection from the eNB that forms a cell that has been selected in the cell selecting process. Then, the reconnecting unit 132*b* transmits, to the eNB that forms the cell that has been selected, a Connection Re-establishment Request signal including the UE context that is stored in the UE context storing unit 133.

The UE context storing unit 133 stores therein UE context on the UE 130. The UE context is identification information for uniquely identifying the UE 130 and includes various kinds of setting information on the UE 130, such as information related to a radio link that is currently set with respect to the UE 130 or parameter information related to radio measurements of the UE 130.

The DeNB 110*a* illustrated in FIG. 2 includes a wireless communication unit 111, a control unit 112, a DeNB information storing unit 113, and a UE context storing unit 114. The wireless communication unit 111 is a communication unit that performs wireless communication between the RN 120 and the UE 130. Specifically, the wireless communication unit 111 establishes a radio link with the RN 120 and performs wireless communication with the RN 120 or with the UE 130 by using a radio link.

Furthermore, the wireless communication unit 111 transmits a signal whose destination is the UE 130. The signal to be transmitted to the UE 130 is, for example, a Connection Re-establishment signal that allows reconnection with the UE 130. Furthermore, the wireless communication unit 111 receives a signal from the UE 130. The signal sent from the UE 130 is, for example, a Connection Re-establishment Request signal that requests reconnection from the DeNB 110a.

The control unit 112, in practice, transmits and receives a signal to/from the RN 120 or the UE 130 via the wireless communication unit 111. However, in the following, for convenience of explanation, a description will sometimes be given as if the control unit 112 directly transmits and receives a signal to/from the RN 120 or the UE 130.

The control unit 112 includes an internal memory for storing therein data and programs prescribing various kinds of procedures, whereby various kinds of processes are executed. Specifically, the control unit 112 includes a DeNB information management unit 112a and a reconnection determining unit 112b.

The DeNB information management unit 112a manages the identification information on the DeNB 110a stored in the DeNB information storing unit 113. Specifically, if the DeNB information management unit 112a receives an identification information transmission request signal from the RN 120, the DeNB information management unit 112a reads the identification information on the DeNB 110a stored in the DeNB information storing unit 113 and transmits the identification information to the RN 120.

The reconnection determining unit 112b determines whether to allow reconnection with the UE 130. Specifically, if the reconnection determining unit 112b receives a Connection Re-establishment Request signal, the reconnection determining unit 112b determines whether the UE context included in the received signal is stored in the UE context storing unit 114. If the UE context has been stored, the reconnection determining unit 112b determines to allow the reconnection with the UE 130 and transmits the Connection Re-establishment signal indicating this determination to the UE 130. In the first embodiment, the DeNB 110a acquires the UE context from the UE 130 via the RN 120 and retains the UE context in the UE context storing unit 114. Consequently, the UE context included in the Connection Re-establishment Request signal is stored in the UE context storing unit 114. Accordingly, the reconnection determining unit 112b transmits the Connection Re-establishment signal to the UE 130.

If the UE context included in the received Connection Re-establishment Request signal is not stored in the UE context storing unit 114, the reconnection determining unit 112b performs the following process. Namely, the reconnection determining unit 112b determines to reject reconnection with the UE 130 and transmits a Connection Re-establishment Reject signal indicating this determination to the UE 130.

The DeNB information storing unit 113 stores therein identification information on the DeNB 110a. The UE context storing unit 114 stores therein the UE context on the UE 130. In the first embodiment, the UE context stored in the UE context storing unit 114 is UE context that has been acquired by the DeNB 110a from the UE 130 via the RN 120.

Figure 3:
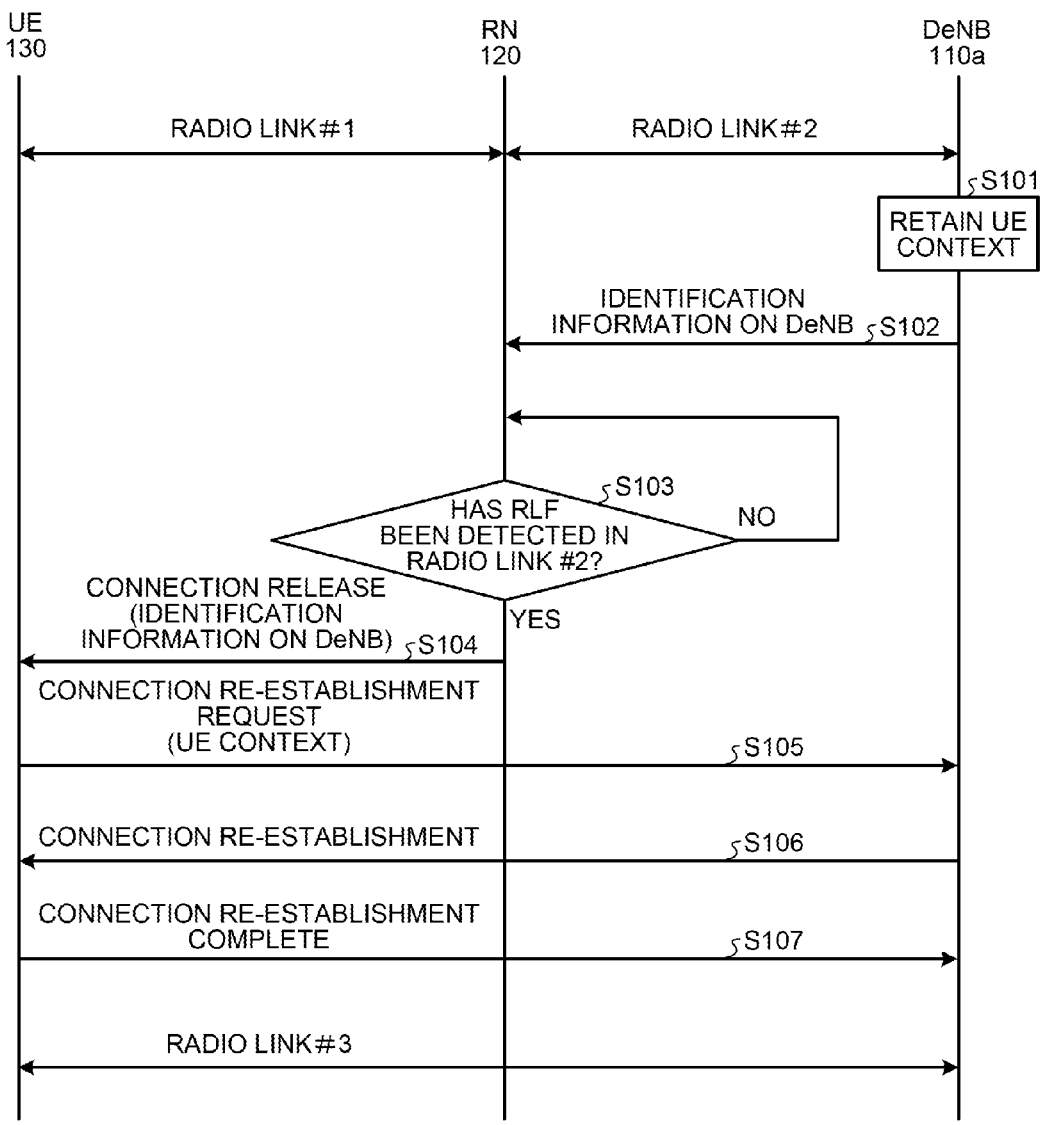
FIG. 3 is a sequence diagram illustrating the flow of a reconnecting process performed by the wireless communication system according to the first embodiment.

In the following, the flow of the reconnecting process performed by the wireless communication system 100 according to the first embodiment will be described. FIG. 3 is a sequence diagram illustrating the flow of the reconnecting process performed by the wireless communication system 100 according to the first embodiment. The example in FIG. 3 illustrates a state in which a radio link #1 has been established between the UE 130 and the RN 120 and a radio link #2 has been established between the RN 120 and the DeNB 110a.

As illustrated in FIG. 3, the DeNB 110a acquires UE context from the RN 120 and retains the UE context in the UE context storing unit 114 (Step S101). The RN 120 transmits an identification information transmission request signal to the DeNB 110a.

Then, the RN 120 acquires, via the radio link #2 in accordance with the identification information transmission request signal, the identification information on the DeNB 110a transmitted from the DeNB 110a (Step S102). The acquired identification information on the DeNB 110a is stored in the DeNB information storing unit 123.

Subsequently, the RN 120 detects an RLF in the radio link #2 that has been established between the DeNB 110a and the RN 120 (Step S103). If an RLF is not detected in the radio link #2 (No at Step S103), the RN 120 continues to relay wireless communication between the DeNB 110a and the UE 130 by using the radio link #1 and the radio link #2.

In contrast, if an RLF is detected in the radio link #2 (Yes at Step S103), the RN 120 generates a Connection Release signal that instructs the UE 130 to release the connection with the RN 120. Then, the RN 120 notifies the UE 130 of the created Connection Release signal by including the identification information on the DeNB 110a stored in the DeNB information storing unit 123 in the Connection Release signal (Step S104).

Then, the UE 130 generates a Connection Re-establishment Request signal that requests reconnection from the DeNB 110a identified by the identification information that is included in the received Connection Release signal. Then, the UE 130 transmits, to the DeNB 110a, the Connection Re-establishment Request signal including the UE context that is stored in the UE context storing unit 133 (Step S105).

Subsequently, because the UE context included in the received Connection Re-establishment Request signal is stored in the UE context storing unit 114, the DeNB 110a performs the following process. Namely, the DeNB 110a determines to allow the reconnection with the UE 130 and transmits the Connection Re-establishment signal indicating this determination to the UE 130 (Step S106).

Then, if the UE 130 receives the Connection Re-establishment signal, the UE 130 transmits the Connection Re-establishment Complete signal to the DeNB 110a (Step S107). Consequently, a radio link #3 is established between the DeNB 110a and the UE 130, and thus establishment of the reconnection between the UE 130 and the DeNB 110a is successful.

As described above, in the first embodiment, the RN 120 notifies the UE 130 of the identification information on the DeNB 110a that retains the UE context used for wireless communication with the UE 130. If the connection with the RN 120 is released, the UE 130 performs the reconnecting process on the DeNB 110a that is identified by the identification information received from the RN 120 as a notification. It is prescribed in LTE-Advanced systems that an eNB that has received a reconnection request from a UE is allowed to continue wireless communication with the UE in accordance with a reconnection request only when the eNB retains the UE context. Consequently, according to the first embodiment, because the UE 130 performs a reconnecting process on the DeNB 110a that retains the UE context, the UE 130 can continue wireless communication even if an RLF occurs between the RN 120 and the DeNB 110a.

Furthermore, in the first embodiment, if an RLF is detected in the radio link with the DeNB 110a, the notifying unit 122c sends a notification to the UE 130 by including the identification information on the DeNB 110a in the Connection Release signal. Consequently, according to the first embodiment, the identification information on the DeNB 110a can be efficiently sent to the UE 130 as a notification by using an existing Connection Release signal that is used when the connection with the RN 120 is released.

[b] Second Embodiment

In the first embodiment, a description has been given of a case in which, when an RLF has occurred in the radio link between the RN 120 and the DeNB 110a, the RN 120 notifies the UE 130 of the identification information on the DeNB 110a by including the information in a Connection Release signal. However, the RN 120 may also previously notify the UE 130 of the identification information on the DeNB 110a before an RLF occurs in the radio link between the RN 120 and the DeNB 110a. Accordingly, in the following, such an example will be described as a second embodiment.

Figure 4:
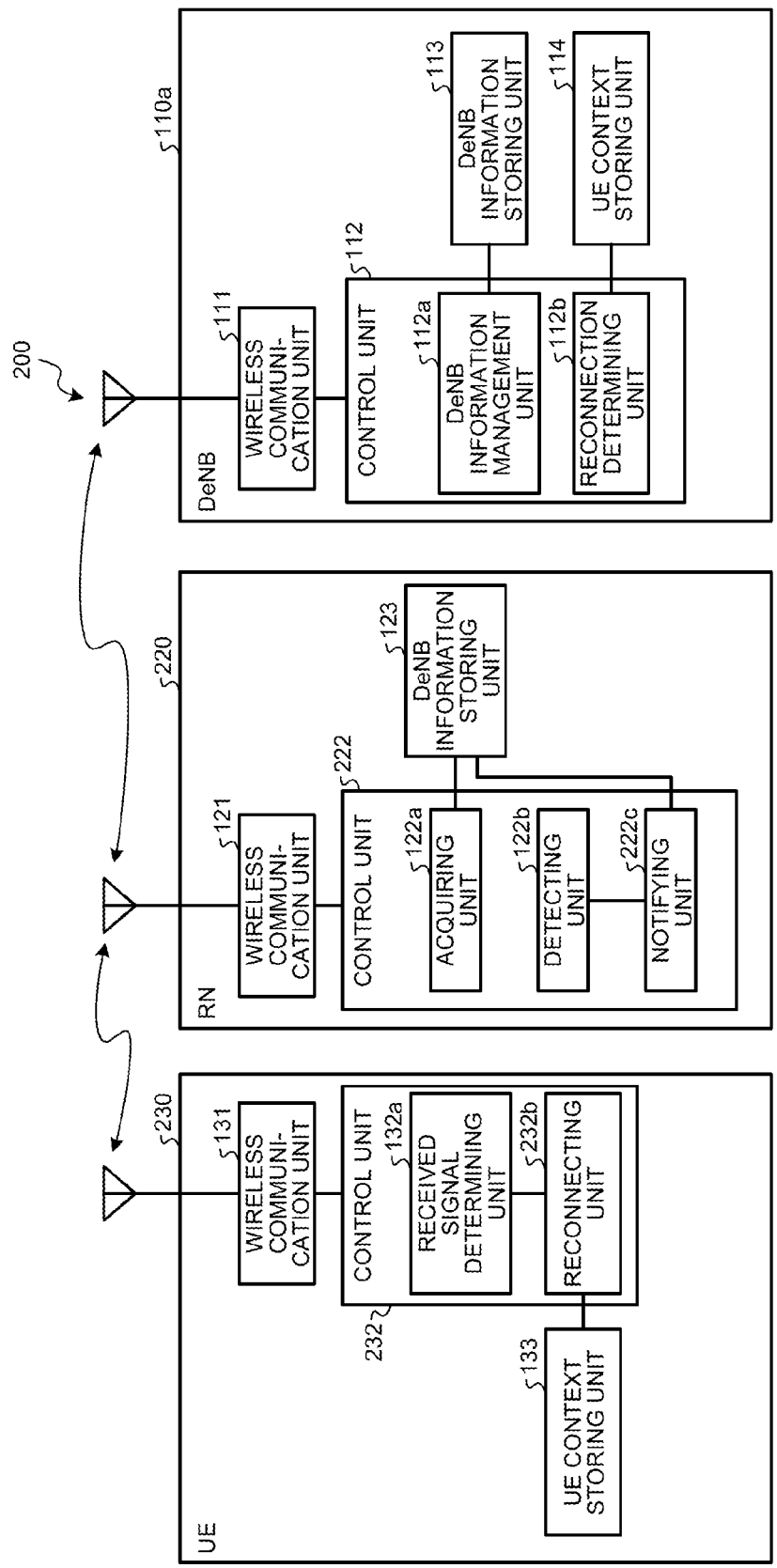
FIG. 4 is a block diagram illustrating the configuration of a wireless communication system according to a second embodiment.

FIG. 4 is a block diagram illustrating the configuration of a wireless communication system 200 according to a second embodiment. In the second embodiment, functioning units having the same function as those illustrated in FIG. 2 are assigned the same reference numerals; therefore, a description thereof in detail is omitted. As illustrated in FIG. 4, the wireless communication system 200 according to the second embodiment includes the DeNB 110a, an RN 220, and a UE 230.

The RN 220 illustrated in FIG. 4 includes the wireless communication unit 121, a control unit 222, and the DeNB information storing unit 123. The control unit 222 includes the acquiring unit 122a, the detecting unit 122b, and a notifying unit 222c.

If a connection between the UE 230 and the RN 220 is established, the notifying unit 222c notifies the UE 230 of the identification information on the DeNB 110a stored in the DeNB information storing unit 123. Specifically, if the wireless communication unit 121 establishes a radio link with the UE 230, the notifying unit 222c notifies the UE 230 of the identification information on the DeNB 110a by using this already established radio link.

Furthermore, if any RLF is detected in the radio link with the DeNB 110a by the detecting unit 122b, the notifying unit 222c generates a Connection Release signal that instructs the UE 230 to release the connection with the RN 220 and then notifies the UE 230 of this.

The UE 230 illustrated in FIG. 4 includes the wireless communication unit 131, a control unit 232, and the UE context storing unit 133. The control unit 232 includes the received signal determining unit 132a and a reconnecting unit 232b.

The reconnecting unit 232b receives the identification information on the DeNB 110a received from the RN 220 as a notification and stores the received identification information on the DeNB 110a in an internal memory.

Furthermore, the reconnecting unit 232b receives the determination result obtained by the received signal determining unit 132a. If the reconnecting unit 232b receives the determination result indicating that the Connection Release signal has been received by the wireless communication unit 131, the reconnecting unit 232b performs the following process. Namely, the reconnecting unit 232b generates a Connection Re-establishment Request signal that requests reconnection from the DeNB 110a that is identified by the identification information stored in the internal memory. Then, the reconnecting unit 232b transmits, to the DeNB 110a, the Connection Re-establishment Request signal including the UE context that is stored in the UE context storing unit 133. Then, the reconnecting unit 232b receives, from the DeNB 110a, the Connection Re-establishment signal in accordance with the Connection Re-establishment Request. Then, the reconnecting unit 232b transmits, to the DeNB 110a, the Connnection Re-establishment Complete signal indicating the reconnection with the DeNB 110a. Consequently, reconnection between the UE 230 and the DeNB 110a is successful, and thus the UE 230 can continue wireless communication with the DeNB 110a.

If the identification information is not stored in the internal memory, the reconnecting unit 232b performs a cell selecting process that selects a cell that satisfies a predetermined quality. For example, the reconnecting unit 232b reperforms, in the cell selecting process from among the cells formed by the eNBs 110a to 110b, the selecting of a cell with the intensity of the transmission radio wave being equal to or greater than a predetermined value. Then, the reconnecting unit 232b generates a Connection Re-establishment Request signal that requests reconnection from the eNB that forms the cell selected in the cell selecting process. Then, the reconnecting unit 232b transmits, to the eNB that forms the selected cell, the Connection Re-establishment Request signal including the UE context that is stored in the UE context storing unit 133.

Figure 5:
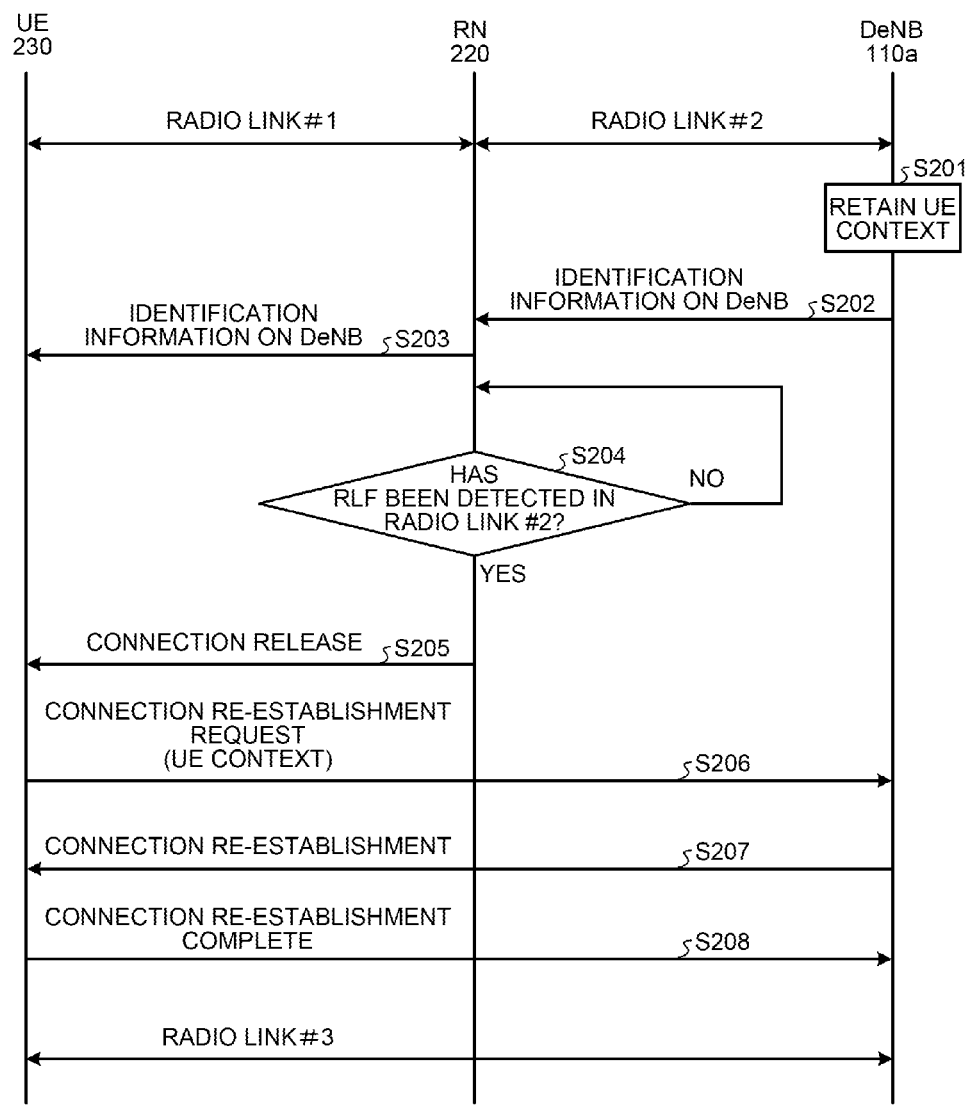
FIG. 5 is a sequence diagram illustrating the flow of a reconnecting process performed by the wireless communication system according to the second embodiment.

In the following, the flow of the reconnecting process performed by the wireless communication system 200 according to the second embodiment will be described. FIG. 5 is a sequence diagram illustrating the flow of the reconnecting process performed by the wireless communication system 200 according to the second embodiment. The example in FIG. 5 illustrates a state in which the radio link #1 has been established between the UE 230 and the RN 220 and the radio link #2 has been established between the RN 220 and the DeNB 110a.

As illustrated in FIG. 5, the DeNB 110a acquires the UE context from the RN 220 and retains the UE context in the UE context storing unit 114 (Step S201). The RN 220 transmits the identification information transmission request signal to the DeNB 110a.

Then, the RN 220 acquires, via the radio link #2, the identification information on the DeNB 110a transmitted from the DeNB 110a in accordance with the identification information transmission request signal (Step S202). The acquired identification information on the DeNB 110a is stored in the DeNB information storing unit 123.

Subsequently, if the radio link #1 is established with the UE 230, the RN 220 notifies the UE 230 of the identification information on the DeNB 110a by using the established radio link #1 (Step S203). Then, the UE 230, which has received the identification information on the DeNB 110a from the RN 220 as a notification, stores the received identification information on the DeNB 110a in the internal memory.

Then, the RN 220 detects an RLF in the radio link #2 that has been established between the DeNB 110a and the RN 220 (Step S204). If any RLF is not detected in the radio link #2 (No at Step S204), the RN 220 continues to relay wireless communication between the DeNB 110a and the UE 230 by using the radio link #1 and the radio link #2.

In contrast, if an RLF is detected in the radio link #2 (Yes at Step S204), the RN 220 generates a Connection Release signal that instructs the UE 230 to release the connection with the RN 220 and then notifies the UE 230 of this (Step S205).

Subsequently, the UE 230 that has received the Connection Release signal performs the following process. Namely, the UE 230 generates a Connection Re-establishment Request signal that requests a reconnection from the DeNB 110a identified by the identification information stored in the internal memory. Then, the UE 230 transmits, to the DeNB 110a, the Connection Re-establishment Request signal including the UE context stored in the UE context storing unit 133 (Step S206).

Then, because the UE context included in the received Connection Re-establishment Request signal is stored in the UE context storing unit 114, the DeNB 110a performs the following process. Namely, the DeNB 110a determines to allow the reconnection with the UE 230 and transmits, to the UE 230, the Connection Re-establishment signal indicating the determination result (Step S207).

Subsequently, if the UE 230 receives the Connection Re-establishment signal, the UE 230 transmits the Connection Re-establishment Complete signal to the DeNB 110a (Step S208). Consequently, because the radio link #3 is established between the DeNB 110a and the UE 230, reconnection between the UE 230 and the DeNB 110a is successful.

As described above, in the second embodiment, if the radio link between the UE 230 and the RN 220 is established, the notifying unit 222c notifies the UE 230 of the identification information on the DeNB 110a via the established radio link. Consequently, according to the first embodiment, if an RLF occurs in the radio link between the RN 220 and the DeNB 110a, the RN 220 can skip the process for including the identification information on the DeNB 110a in the Connection Release signal. Consequently, it is possible to reduce the time from when an RLF occurs in a radio link between the RN 220 and the DeNB 110a until when a radio link between the DeNB 110a and the UE 230 is established, thus speeding up the establishment of the reconnection between the DeNB 110a and the UE 230.

[c] Third Embodiment

In the first embodiment, a description has been given of a case in which the RN 120 notifies the UE 130 of the identification information on the DeNB 110a that retains the UE context. However, the DeNB may also notify another eNB adjacent to the DeNB of the UE context retained by itself, i.e., the DeNB. Accordingly, in the following, such an example will be described as a third embodiment.

Figure 6:
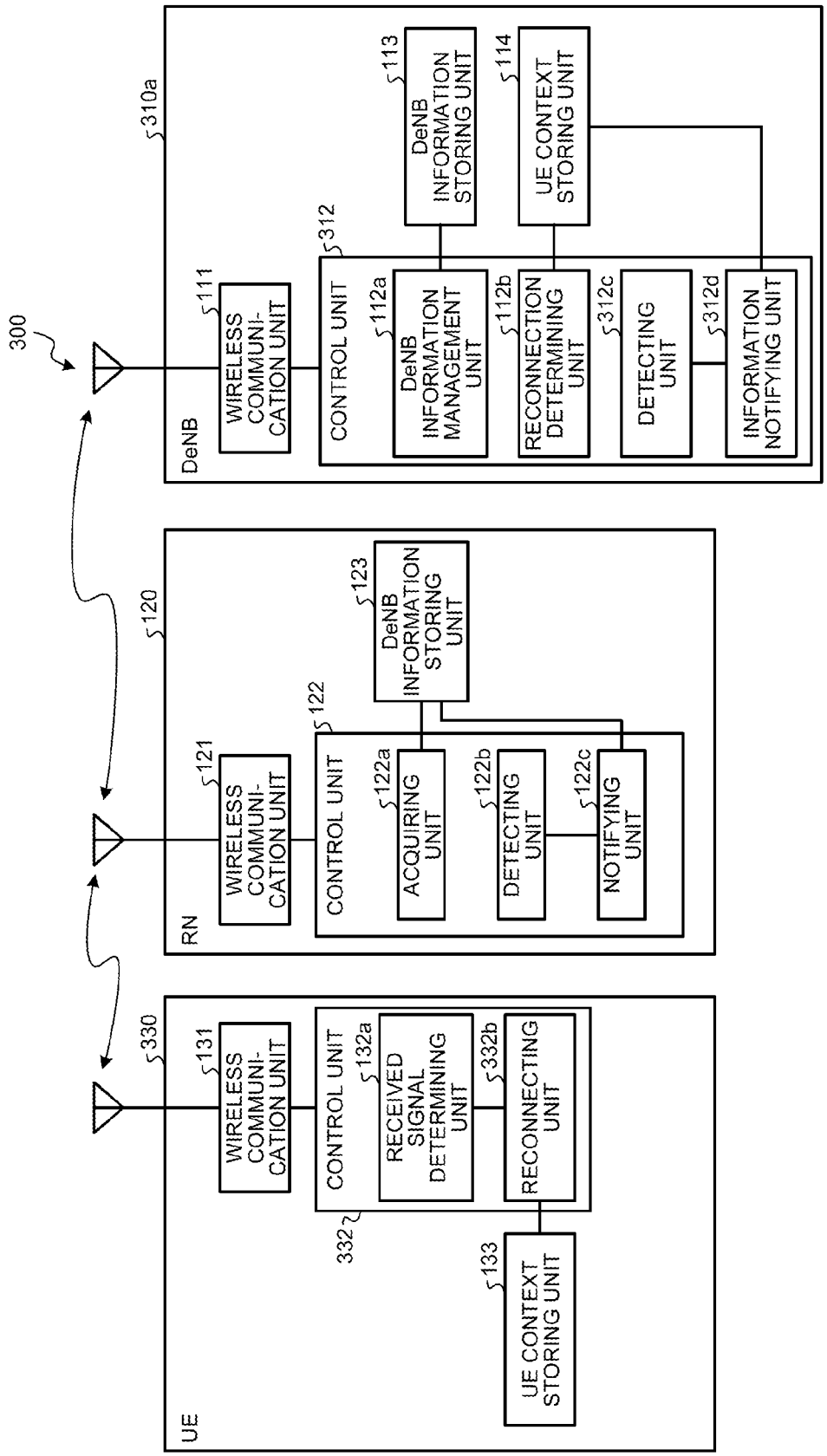
FIG. 6 is a block diagram illustrating the configuration of a wireless communication system according to a third embodiment.

FIG. 6 is a block diagram illustrating the configuration of a wireless communication system 300 according to a third embodiment. In the third embodiment, functioning units having the same function as those illustrated in FIG. 2 are assigned the same reference numerals; therefore, a description thereof in detail is omitted. As illustrated in FIG. 6, the wireless communication system 300 according to the third embodiment includes a DeNB 310a, the RN 120, and a UE 330.

The DeNB 310a illustrated in FIG. 6 includes the wireless communication unit 111, a control unit 312, the DeNB information storing unit 113, and the UE context storing unit 114. The control unit 312 includes the DeNB information management unit 112a, the reconnection determining unit 112b, a detecting unit 312c, and an information notifying unit 312d.

The detecting unit 312c detects an RLF in a communication link established between the DeNB 310a and the RN 120. For example, the detecting unit 312c monitors the reception quality of the signal received from the RN 120 and, if the reception quality becomes equal to or less than a predetermined value, the detecting unit 312c detects an RLF in the radio link established between the DeNB 310a and the RN 120. An example of the reception quality includes received power of, for example, a reference signal.

The information notifying unit 312d retains, in its internal memory, a list of adjacent eNBs, which are other eNBs adjacent to the DeNB 310a. The other eNBs adjacent to the DeNB 310a mentioned here mean that the other eNBs constitute cells adjacent to the cell formed by the DeNB 310a. The information notifying unit 312d refers to the list retained in the internal memory and notifies an adjacent eNB of the UE context on the UE 330 stored in the UE context storing unit 114. Specifically, if the detecting unit 312c detects an RLF in the radio link with the RN 120, the information notifying unit 312d generates a reconnection preparation instruction signal that instructs the adjacent eNB to prepare for reconnection with the UE 330. Then, the information notifying unit 312d notifies the adjacent eNB of the UE context on the UE 330 stored in the UE context storing unit 114 by including the UE context in the generated reconnection preparation instruction. The adjacent eNB that has received the UE context on the UE 330 stores the received UE context in its own UE context storing unit 114.

The UE 330 illustrated in FIG. 6 includes the wireless communication unit 131, a control unit 332, and the UE context storing unit 133. The control unit 332 includes the received signal determining unit 132a and a reconnecting unit 332b.

If the connection with the RN 120 is released before a notification of the identification information on the DeNB 310a is made by the RN 120, the reconnecting unit 332b performs a cell selecting process that selects a cell, from the cell of the DeNB 310a and a cell of the adjacent eNB, that satisfies a predetermined quality. The case in which the connection with the RN 120 is released before a notification of the identification information on the DeNB 310a is made by the RN 120 mentioned here means a case in which identification information on the DeNB 310a is not included in the Connection Release signal received from the RN 120. In such a case, the reconnecting unit 332b generates a Connection Re-establishment Request signal that requests reconnection from the eNB that forms the cell selected in the cell selecting process. Then, the reconnecting unit 332b transmits, to the eNB that forms the selected cell, the Connection Re-establishment Request signal including the UE context stored in the UE context storing unit 133.

At this point, in the UE context storing unit 114 in the eNB that has received the Connection Re-establishment Request signal, the UE context on the UE 330 included in the received Connection Re-establishment Request signal is previously stored. Consequently, the eNB that has received the Connection Re-establishment Request signal sends back, to the UE 330, a Connection Re-establishment signal that allows reconnection with the UE 330. Then, the reconnecting unit 332b receives, from the eNB, the Connection Re-establishment signal in accordance with the Connection Re-establishment Request signal. Then, the reconnecting unit 332b sends, to the eNB, a Connection Re-establishment Complete signal indicating the completion of the reconnection with the eNB. Consequently, reconnection between the UE 330 and the eNB is successful and thus the UE 330 can continue wireless communication with the eNB.

Figure 7:
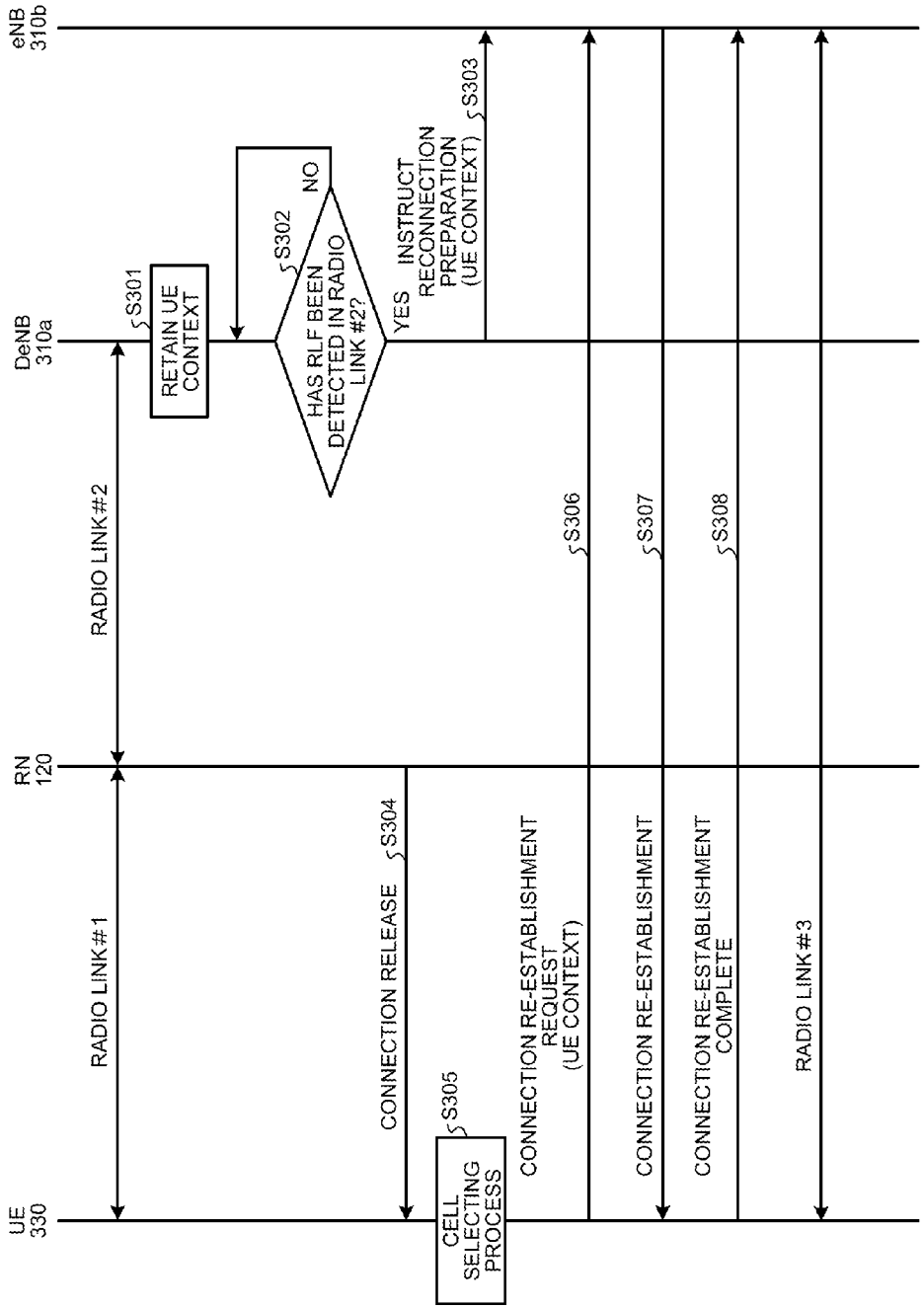
FIG. 7 is a sequence diagram illustrating the flow of a reconnecting process performed by the wireless communication system according to the third embodiment.

In the following, the flow of the reconnecting process performed by the wireless communication system 300 according to the third embodiment will be described. FIG. 7 is a sequence diagram illustrating the flow of the reconnecting process performed by the wireless communication system 300 according to the third embodiment. The example in FIG.

7 illustrates a state in which the radio link #1 has been established between the UE 330 and the RN 120 and the radio link #2 has been established between the RN 120 and the DeNB 310a. Furthermore, it is assumed that an eNB 310b illustrated in FIG. 7 is an adjacent eNB that is adjacent to the DeNB 310a.

As illustrated in FIG. 7, the DeNB 310a acquires the UE context from the UE 330 via the RN 120 and stores the UE context in the UE context storing unit 114 (Step S301). Then, the DeNB 310a detects an RLF in the radio link #2 that has been established between the DeNB 310a and the RN 120 (Step S302). If an RLF is not detected in the radio link #2 (No at Step S302), the DeNB 310a continues wireless communication with the UE 330 by using the radio link #1 and the radio link #2.

In contrast, if an RLF is detected in the radio link #2 (Yes at Step S302), the DeNB 310a notifies the eNB 310b, which is an adjacent eNB, of the UE context on the UE 330 stored in the UE context storing unit 114 (Step S303). Then, the eNB 310b that has received the UE context on the UE 330 stores the received UE context in its own UE context storing unit 114.

Furthermore, if an RLF is detected in the radio link #2, the RN 120 generates a Connection Release signal that instructs the UE 330 to release the connection with the RN 120 and then notifies the UE 330 of this (Step S304).

Subsequently, because the identification information on the DeNB 310a is not included in the Connection Release signal from the RN 120, the UE 330 performs a cell selecting process with respect to the cell group including the cells of the DeNB 310a and the eNB 310b (Step S305). Then, the UE 330 generates a Connection Re-establishment Request signal that requests reconnection from the eNB 310b that forms a cell that has been selected in the cell selecting process. Then, the UE 330 transmits, to the eNB 310b, the Connection Re-establishment Request signal including the UE context that is stored in the UE context storing unit 133 (Step S306).

Subsequently, because the UE context included in the received Connection Re-establishment Request signal is stored in the UE context storing unit 114, the eNB 310b performs the following process. Namely, the eNB 310b determines that the reconnection with the UE 330 is allowed and transmits a Connection Re-establishment signal indicating this determination to the UE 330 (Step S307).

Then, if the UE 330 receives the Connection Re-establishment signal, the UE 330 transmits a Connection Re-establishment Complete signal to the eNB 310b (Step S308). Consequently, the radio link #3 is established between the eNB 310b and the UE 330 and thus reconnection between the UE 330 and the eNB 310b is successful.

As described above, in the third embodiment, the DeNB 310a that retains the UE context used for wireless communication with the UE 330 notifies the adjacent eNB of the UE context. Then, if the connection with the RN 120 is released before a notification of the identification information on the DeNB 310a is made by the RN 120, the UE 330 performs a cell selecting process with respect to the cell of the DeNB 310a and the cell of the adjacent eNB. Then, the UE 330 performs the reconnecting process with respect to the eNB that forms the cell that has been selected in the cell selecting process. It is prescribed in LTE-Advanced systems that an eNB that has received a reconnection request from a UE is allowed to continue wireless communication with the UE in accordance with the reconnection request only when the eNB retains the UE context. Consequently, according to the third embodiment, because the UE 330 performs the reconnecting process with respect to the eNB that retains the UE context, the UE 330 can continue wireless communication even if an RLF occurs in the radio link between the RN 120 and the DeNB 310a.

Furthermore, in the third embodiment, if an RLF is detected in the radio link between the RN 120 and the DeNB 310a, the information notifying unit 312d notifies the adjacent eNB of the UE context by including the UE context in the reconnection preparation instruction signal. Consequently, according to the third embodiment, the adjacent eNB can be efficiently notified of the UE context together with being sent an instruction to reconnect to the adjacent eNB.

[d] Fourth Embodiment

In the third embodiment described above, a description has been given of a case in which, if an RLF occurs in the radio link between the RN 120 and the DeNB 310a, the DeNB 310a notifies an adjacent eNB of the UE context. However, the DeNB 310a may also previously notify an adjacent eNB of the UE context before an RLF occurs in the radio link between the RN 120 and the DeNB 310a. Accordingly, in the following, such an example will be described as a fourth embodiment.

Figure 8:
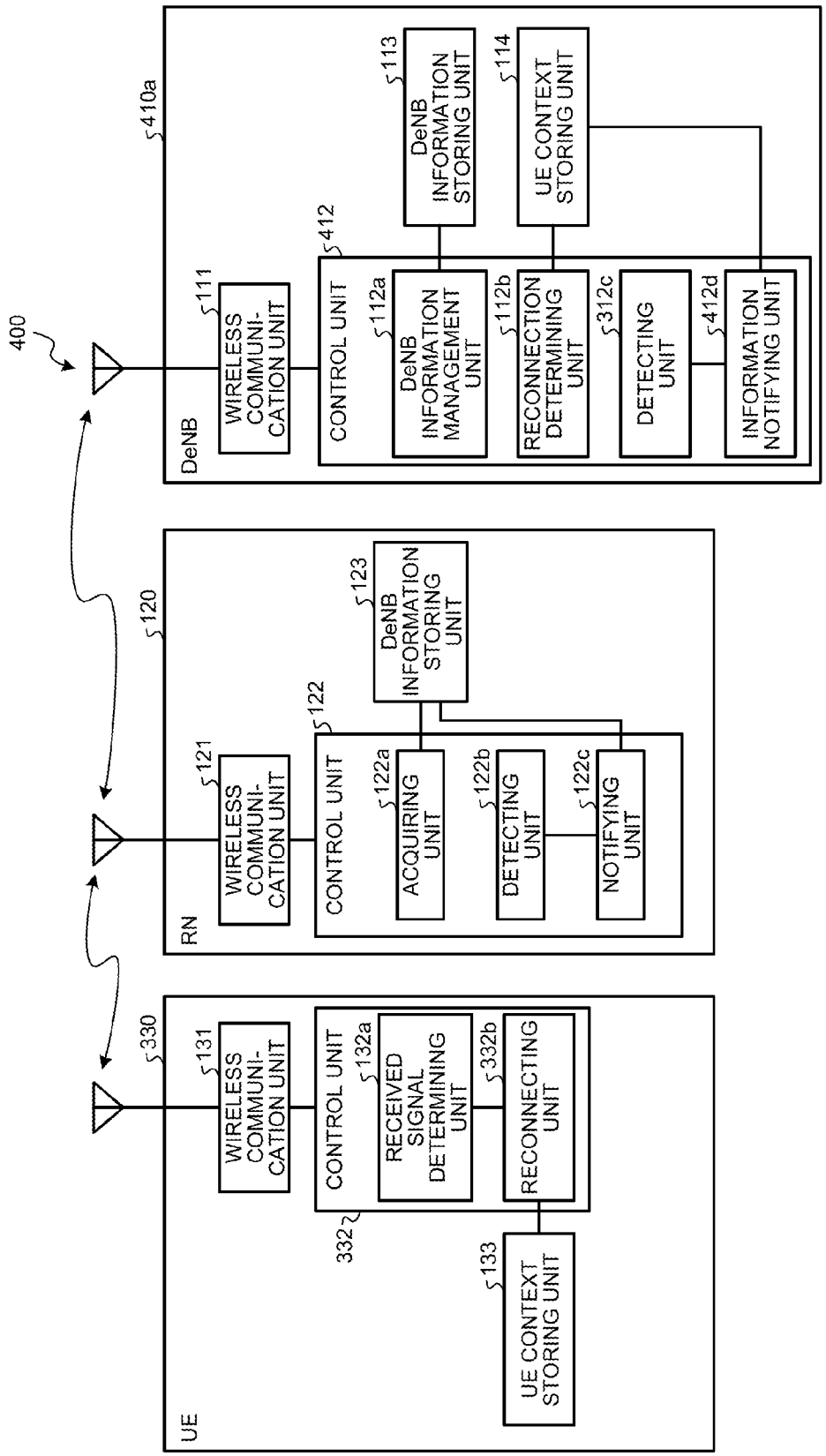
FIG. 8 is a block diagram illustrating the configuration of a wireless communication system according to a fourth embodiment.

FIG. 8 is a block diagram illustrating the configuration of a wireless communication system 400 according to a fourth embodiment. In the fourth embodiment, functioning units having the same function as those illustrated in FIG. 6 are assigned the same reference numerals; therefore, a description thereof in detail is omitted. As illustrated in FIG. 8, the wireless communication system 400 according to the fourth embodiment includes a DeNB 410a, the RN 120, and the UE 330.

The DeNB 410a illustrated in FIG. 8 includes the wireless communication unit 111, a control unit 412, the DeNB information storing unit 113, and the UE context storing unit 114. The control unit 412 includes the DeNB information management unit 112a, the reconnection determining unit 112b, the detecting unit 312c, and an information notifying unit 412d.

The information notifying unit 412d retains, in its internal memory, a list of adjacent eNBs, which are other eNBs adjacent to the DeNB 410a. If a connection between the DeNB 410a and an adjacent eNB is established, the information notifying unit 412d notifies the adjacent eNB of the UE context stored in the UE context storing unit 114. Specifically, if the wireless communication unit 111 establishes a radio link with an adjacent eNB, the information notifying unit 412d notifies the adjacent eNB of the UE context by using the established radio link.

Furthermore, if the detecting unit 312c detects an RLF in the radio link with the RN 120, the information notifying unit 412d generates a reconnection preparation instruction signal that instructs the adjacent eNB to prepare for reconnection with the UE 330. Then, the information notifying unit 412d notifies the adjacent eNB of the UE context on the UE 330 stored in the UE context storing unit 114 by including the UE context in the generated reconnection preparation instruction signal. The adjacent eNB that has received the UE context on the UE 330 stores the received UE context in its own UE context storing unit 114.

In the following, the flow of the reconnecting process performed by the wireless communication system 400 according to the fourth embodiment will be described. FIG. 9 is a sequence diagram illustrating the flow of a reconnecting process performed by the wireless communication system 400 according to the fourth embodiment. The example in FIG. 9 illustrates a state in which the radio link #1 has been established between the UE 330 and the RN 120 and the radio link #2 has been established between the RN 120 and the DeNB 410*a*. Furthermore, it is assumed that an eNB 410*b* illustrated in FIG. 9 is an adjacent eNB adjacent to the DeNB 410*a*.

As illustrated in FIG. 9, the DeNB 410*a* acquires the UE context from the UE 330 via the RN 120 and retains the UE context in the UE context storing unit 114 (Step S401). Subsequently, the DeNB 410*a* establishes a radio link with the eNB 410*b* and then notifies the eNB 410*b* of the UE context on the UE 330 by using the established radio link (Step S402). Then, the eNB 410*b* that has received the UE context on the UE 330 stores the received UE context in its own UE context storing unit 114.

Subsequently, the DeNB 410*a* detects an RLF in the radio link #2 that has been established between the DeNB 410*a* and the RN 120 (Step S403). If an RLF is not detected in the radio link #2 (No at Step S403), the DeNB 410*a* continues wireless communication with the UE 330 by using the radio links #1 and the radio link #2.

In contrast, if an RLF is detected in the radio link #2 (Yes at Step S403), the DeNB 410*a* generates a reconnection preparation instruction signal that instructs preparations to made for reconnection with the UE 330 and then notifies the eNB 410*b* of this (Step S404). Then, the eNB 410*b* that has received the reconnection preparation instruction signal starts to capture transmission radio waves from the UE 330 in preparation for reconnection with the UE 330.

Furthermore, if an RLF is detected in the radio link #2, the RN 120 generates a Connection Release signal that instructs the UE 330 to release the reconnection with the RN 120 and then notifies the UE 330 of this (Step S405).

Subsequently, because the identification information on the DeNB 410*a* is not included in the Connection Release signal received from the RN 120, the UE 330 performs a cell selecting process with respect to a cell group including the cell of the DeNB 410*a* and the cell of the eNB 410*b* (Step S406). Then, the UE 330 generates a Connection Re-establishment Request signal that requests reconnection from the eNB that forms the cell that has been selected in the cell selecting process. Then, the UE 330 transmits, to the eNB 410*b*, the Connection Re-establishment Request signal by adding the UE context stored in the UE context storing unit 133 thereto (Step S407).

Subsequently, because the UE context included in the received Connection Re-establishment Request signal is stored in the UE context storing unit 114, the eNB 410*b* performs the following process. Namely, the eNB 410*b* determines that reconnection with the UE 330 is allowed and transmits, to the UE 330, a Connection Re-establishment signal indicating this determination (Step S408).

Subsequently, when the UE 330 receives the Connection Re-establishment signal, the UE 330 transmits the Connection Re-establishment Complete signal to the eNB 410*b* (Step S409). Consequently, the radio link #3 is established between the eNB 310*b* and the UE 330 and thus reconnection between the UE 330 and the eNB 410*b* is successful.

As described above, in the fourth embodiment, if a radio link between the DeNB 410*a* and the RN 120 is established, the information notifying unit 412*d* notifies an adjacent eNB of the UE context by using the established radio link. Consequently, according to the fourth embodiment, if an RLF occurs in the radio link between the RN 120 and the DeNB 410*a*, the DeNB 410*a* can skip the process for including the UE context in the reconnection preparation instruction signal. Consequently, it is possible to reduce the time from when an RLF occurs in a radio link between the RN 120 and the DeNB 410*a* until when a radio link between the adjacent eNB and the UE 330 is re-established, thus speeding up the establishment of the reconnection between the adjacent eNB and the UE 330.

According to an aspect of the wireless communication system disclosed in the present invention, an advantage is provided in that, even if wireless communication between a relay station and a base station is disconnected, the wireless communication between the base station and the mobile station can be continued.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system in which a relay station relays wireless communication between a base station and a mobile station, wherein
    the relay station includes
        a detecting unit that detects any failure in a radio link with the base station,
        an acquiring unit that acquires, from the base station that retains information on the mobile station used for the wireless communication, identification information on the base station, and
        a notifying unit that notifies, when the detecting unit detects the failure in the radio link with the base station, the mobile station of the identification information acquired by the acquiring unit by including the identification information in a connection release instruction that instructs the mobile station to release connection with the relay station, and
    the mobile station includes
        a reconnecting unit that performs, when the connection with the relay station is released, a reconnecting process with respect to the base station that is identified by the identification information that has been notified by the relay station to the mobile station.

2. The wireless communication system according to claim 1, wherein, when connection between the mobile station and the relay station is established, the notifying unit notifies the mobile station of the identification information via the established connection.

3. The wireless communication system according to claim 1, wherein
    the base station that retains the information on the mobile station used for the wireless communication includes an information notifying unit that notifies an adjacent base station, which is another base station adjacent to the base station, of the information on the mobile station, and
    the reconnecting unit selects, when the connection with the relay station is released before the identification information is notified by the relay station, a cell that satisfies a predetermined quality from a cell of the base station and a cell of the adjacent base station that has been notified by the base station of the information on the mobile station and the reconnecting unit then performs the reconnecting process with respect to the base station that forms the selected cell.

4. The wireless communication system according to claim 3, wherein
the base station further includes a detecting unit that detects any failure in a radio link with the relay station, and
when the detecting unit detects the failure in the radio link with the relay station, the information notifying unit notifies the adjacent base station of the information on the mobile station by including the information in a reconnection preparation instruction that instructs the adjacent base station to prepare to reconnect with the mobile station.

5. The wireless communication system according to claim 3, wherein, when connection between the base station and the adjacent base station is established, the information notifying unit notifies the adjacent base station of the information on the mobile station via the established connection.

6. A relay station that relays wireless communication between a base station and a mobile station, the relay station comprising:
a detecting unit that detects any failure in a radio link with the base station,
an acquiring unit that acquires, from the base station that retains information on the mobile station used for the wireless communication, identification information on the base station; and
a notifying unit that notifies, when the detecting unit detects the failure in the radio link with the base station, the mobile station, as a target for a reconnecting process performed by the mobile station, of the identification information acquired by the acquiring unit by including the identification information in a connection release instruction that instructs the mobile station to release connection with the relay station.

7. A wireless communication method that is used in a wireless communication system in which a relay station relays wireless communication between a base station and a mobile station, the wireless communication method comprising:
detecting, by the relay station, any failure in a radio link with the base station,
acquiring, by the relay station from the base station that retains information on the mobile station used for the wireless communication, identification information on the base station;
notifying, by the relay station, when the failure in the radio link with the base station is detected at the detecting, of the acquired identification information to the mobile station by including the identification information in a connection release instruction that instructs the mobile station to release connection with the relay station; and
performing, by the mobile station when the connection with the relay station is released, a reconnecting process with respect to the base station that is identified by the identification information notified by the relay station to the mobile station.

8. The wireless communication method according to claim 7, further comprising:
notifying, by the base station that retains the information on the mobile station used for the wireless communication, an adjacent base station, which is another base station adjacent to the base station, of the information on the mobile station;
selecting, by the mobile station when the connection with the relay station is released before the identification information is notified by the relay station to the mobile station, a cell that satisfies a predetermined quality from a cell of the base station and a cell of the adjacent base station that has been notified by the base station of the information on the mobile station; and
performing, by the mobile station, a reconnection request with respect to the base station that forms the selected cell.

* * * * *